Jan. 15, 1935. B. G. CARLSON 1,987,666

PRESSURE REGULATING MEANS FOR AIRCRAFT INSTRUMENTS

Filed March 21, 1934

INVENTOR
Bert G. Carlson
BY
Herbert H. Thompson
HIS ATTORNEY.

Patented Jan. 15, 1935

1,987,666

UNITED STATES PATENT OFFICE 1,987,666

PRESSURE REGULATING MEANS FOR AIRCRAFT INSTRUMENTS

Bert G. Carlson, Queens Village, N. Y., assignor to Sperry Gyroscope Company, Inc., Brooklyn, N. Y., a corporation of New York Application March 21, 1934, Serial No. 716,671

3 Claims. (Cl. 137—153)

This invention relates to pressure regulating means for supplying air at constant pressure to gyroscopic indicators on aircraft. At present several of such indicators are usually employed, including the turn indicator, directional gyroscope, and the artificial horizon, in all three of which it is highly desirable that the speed of rotation be maintained constant. Since the speed of the aircraft engine and also the speed of the aircraft varies from time to time, it is obvious that the pressure supply would also vary if driven from the aircraft engine or supplied by means of a Venturi tube. In my invention I propose to interpose between the pressure supply and the indicators a regulating valve for maintaining the pressure substantially constant within fairly wide limits. In this specification I use the term "pressure" in the broad sense to include either super-atmospheric pressure or under-atmospheric pressure (vacuum), the latter being the system most usually employed at the present time.

Referring to the drawing showing one form my invention may assume,

Figure 1:
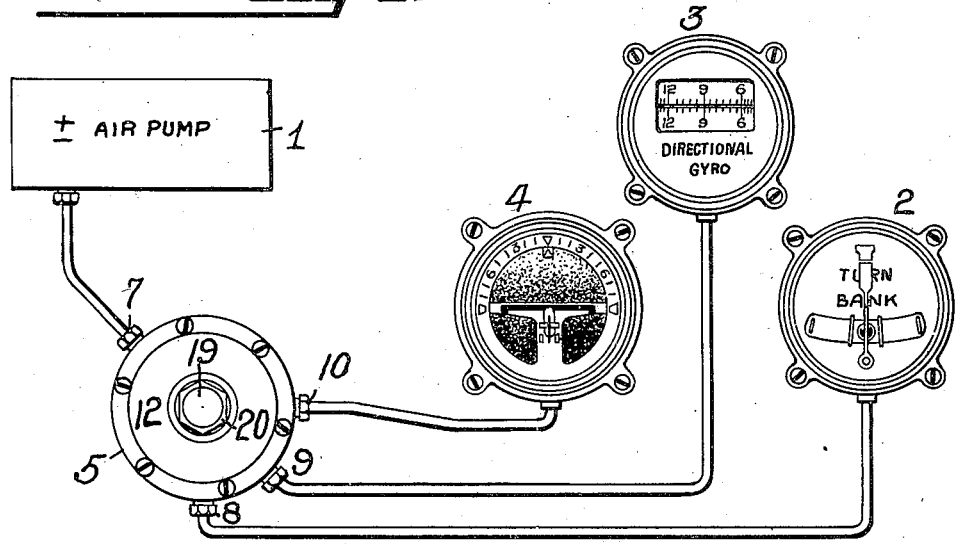
Fig. 1 is a diagram showing my regulator placed between the vacuum pump and the gyroscopic instruments.
Figure 2:
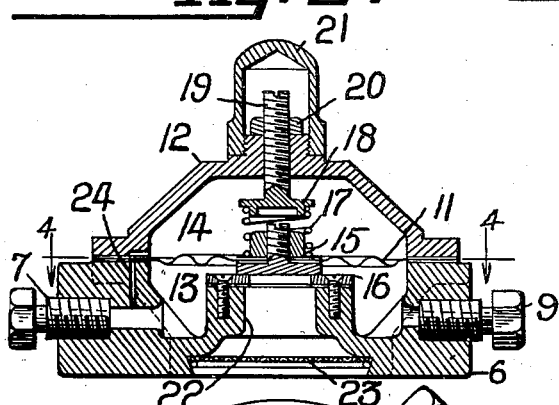
Fig. 2 is a vertical section of the regulating device.
Figure 3:
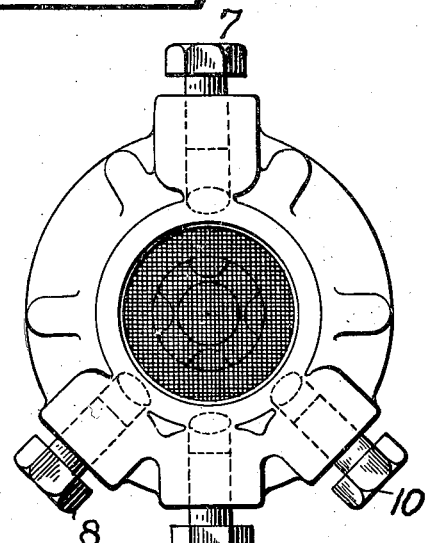
Fig. 3 is a bottom plan view of the same.
Figure 4:
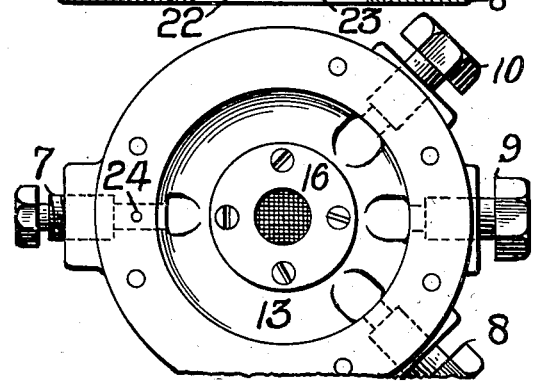
Fig. 4 is a section taken approximately on line 4—4 in Fig. 2.

In Fig. 1 the rectangle 1 may represent any form of pressure producing means, such as a vacuum or pressure pump or Venturi tube. A plurality of air-driven gyroscopic instruments is shown at the right hand side of said figure, the turn indicator being shown at 2, the directional gyro at 3, and an artificial horizon at 4. Between the pump and said instruments I place my regulating valve 5. As shown, said valve comprises a base 6, into one side of which is tapped the pipe connection 7 leading to the pump 1. Into the other side are tapped the pipe connections 8, 9 and 10 leading to the gyroscopic instruments. If the instruments do not require the same pressure, this may be regulated by varying the size of the bore in the respective pipes. Closing the top of said base 6 is a flexible air-tight diaphragm 11, preferably of thin corrugated flexible sheet metal. Said diaphragm is shown as clamped at its edges between said base and the top portion 12, thus providing two chambers, 13 below said diaphragm and 14 above said diaphragm. I also provide a restricted opening 24 between the chambers 13 and 14, preferably connected to the interior of the pipe 7 leading to the pump, as shown. At its center said diaphragm is made to act as a valve to cooperate with a valve seat 16, as by being secured at its center to the back of a valve 15 normally held on seat 16 by means of a spring 17 which acts between the top of said valve and a collar 18 on an adjustable set screw 19 threaded in the top of the member 12. Obviously the stiffness or compression of said spring may be varied by adjusting said set screw 19 and locking it in place by means of the lock nut 20. A protective cap 21 is shown over the set screw. The seat 16 of said valve is shown as secured to the top of a central boss 22 in the center of said base 6, which is open to the atmosphere through a screen 23.

Obviously, as the pressure rises and falls in pipe 7, the pressure will also rise and fall in the chamber 14, but at a slower or average rate due to the small size of the restricted passage 24. It should also be remembered that while the pressure in the chambers 13 and 14 is normally equal, a greater pressure is exerted downwardly on the piston 15 from chamber 14 than is exerted upwardly from the chamber 13 owing to the fact that the face of the piston is not in communication with the chamber 13 when closed. The central portion of said face is, however, under atmospheric pressure which is superior to that in chambers 13 and 14. If the spring 17 is adjusted so as to maintain said valve closed until the vacuum or negative pressure in the chamber 14 becomes a predetermined amount, at that time said piston will open slightly and admit atmospheric air into the chamber 13, thus in effect lessening the pull on the pipes 8, 9 and 10 by taking part of the air directly from the atmosphere through the valve 15, 16 instead of all of said air being withdrawn from the instruments. When, however, a greater quantity of air passes through the pipe 7 owing to this influx of air through the valve 15, 16, the pressure will rise, thus causing a rise in pressure in the chamber 14, thus exerting a greater downward pressure on the piston and closing the same. By careful adjustment my valve may be made to operate within narrow limits so as to maintain the vacuum in the instruments substantially constant in spite of wide variations in pump pressure. Also, my valve is not subject to pounding, chattering or fluttering, as are existing devices of this character, owing to the restricted character of the passage 24 which averages or damps pressure changes so that the valve is only responsive to a continued change of pressure.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a pressure regulating system for aircraft instruments, a device adapted to be placed between the pump and the instruments comprising a casing, a flexible diaphragm dividing the interior thereof into two chambers, one of which is in direct communication with the pump and instruments, and the other connected with the first chamber by a restricted passage, a valve seat associated with said diaphragm lessening the area thereof exposed to the pressure in said first chamber and exposing a limited area to atmospheric pressure, and spring means for holding said valve normally closed, whereby when the pressure differential on the instruments becomes more than a predetermined amount, said valve opens to admit atmospheric air.

2. In a pressure regulating system for aircraft instruments, a device adapted to be placed between the pump and the instruments comprising a casing, means dividing the interior thereof into two chambers, one of which is in direct communication with the pump and instruments, and the other connected with the pump side of said first chamber, a valve seat associated with said means lessening the area thereof exposed to the pressure in said first chamber and exposing a limited area to atmospheric pressure, and spring means for holding said valve normally closed, whereby when the pressure differential on the instruments becomes more than a predetermined amount, said valve opens to admit atmospheric air.

3. In a pressure regulating system for aircraft instruments, a differential valve in which one side is exposed to pump pressure through a restricted passage and the other side to atmospheric pressure, yielding means for maintaining said valve normally closed until the pump pressure differential exceeds a predetermined amount, and means for by-passing atmospheric air into the pump by the opening of said valve.

BERT G. CARLSON.